United States Patent
Wilson et al.

(10) Patent No.: US 9,463,495 B2
(45) Date of Patent: Oct. 11, 2016

(54) LABORATORY FUME HOOD SYSTEM HAVING RECESSED HEAT EXCHANGER SYSTEM

(71) Applicants: George S. Wilson, Lawrence, KS (US); William Scott Jeffress, Baldwin City, KS (US); Frank J. Schoenen, Lawrence, KS (US)

(72) Inventors: George S. Wilson, Lawrence, KS (US); William Scott Jeffress, Baldwin City, KS (US); Frank J. Schoenen, Lawrence, KS (US)

(73) Assignee: UNIVERSITY OF KANSAS, Lawrence, KS (US)

( * ) Notice: Subject to any disclaimer, the term of this patent is extended or adjusted under 35 U.S.C. 154(b) by 307 days.

(21) Appl. No.: 13/966,496

(22) Filed: Aug. 14, 2013

(65) Prior Publication Data

US 2013/0331018 A1     Dec. 12, 2013

Related U.S. Application Data

(63) Continuation-in-part of application No. 12/393,362, filed on Feb. 26, 2009.

(60) Provisional application No. 61/682,951, filed on Aug. 14, 2012.

(51) Int. Cl.
| | |
|---|---|
| *B08B 15/02* | (2006.01) |
| *F28D 15/00* | (2006.01) |
| *F28D 21/00* | (2006.01) |
| *B23P 19/00* | (2006.01) |
| *B01L 1/00* | (2006.01) |
| *B01L 7/00* | (2006.01) |

(52) U.S. Cl.
CPC ............... *B08B 15/023* (2013.01); *B01L 1/50* (2013.01); *B23P 19/00* (2013.01); *F28D 15/00* (2013.01); *B01L 7/00* (2013.01); *B01L 2300/185* (2013.01); *F28D 2021/0019* (2013.01); *Y10T 29/49826* (2015.01)

(58) Field of Classification Search
CPC .. B08B 15/023; B01L 1/50; B01L 2300/185; B01L 7/00; B23P 19/00; F28D 15/00; F28D 2021/019; Y10T 29/49826
USPC ........ 219/218; 454/56–62, 43, 49; 62/259.1, 62/259.2, 261, 263, 268, 270; 165/71, 165/278; 422/38; 73/54.43
See application file for complete search history.

(56) References Cited

U.S. PATENT DOCUMENTS

| | | | |
|---|---|---|---|
| 2,209,099 A * | 7/1940 | Grueneklee | B01L 7/00 165/64 |
| 3,326,277 A | 6/1967 | Osborne | |

(Continued)

OTHER PUBLICATIONS

International Search Report and Written Opinion dated Dec. 16, 2013 from related PCT Application No. PCT/US2013/054886 filed Aug. 14, 2013.

(Continued)

*Primary Examiner* — John K Fristoe, Jr.
*Assistant Examiner* — Daphne M Barry
(74) *Attorney, Agent, or Firm* — STINSON LEONARD STREET LLP

(57) ABSTRACT

A laboratory fume hood system for cooling at least one laboratory device located in an interior work area comprises a heat exchanger system having a heat exchanger in thermal communication with a primary fluid loop containing chilled fluid and a secondary fluid loop containing a cooling fluid which is in thermal communication the laboratory device. The primary fluid loop is located behind the fume hood wall and not in the interior work area.

14 Claims, 5 Drawing Sheets

(56) References Cited

U.S. PATENT DOCUMENTS

| | | | |
|---|---|---|---|
| 3,745,908 A * | 7/1973 | Mayberry | B08B 15/023 454/57 |
| 4,415,847 A | 11/1983 | Galloway | |
| 4,534,281 A | 8/1985 | Parks et al. | |
| 4,718,478 A | 1/1988 | Huber | |
| 5,058,391 A * | 10/1991 | Periot | B60H 1/143 62/238.6 |
| 5,113,927 A | 5/1992 | Kedar et al. | |
| 5,492,873 A * | 2/1996 | Maier | B01J 19/1893 502/322 |
| 5,566,062 A | 10/1996 | Quisenberry et al. | |
| 5,579,650 A | 12/1996 | Cleland et al. | |
| 5,634,351 A | 6/1997 | Larson et al. | |
| 5,687,707 A | 11/1997 | Prasser | |
| 5,716,267 A | 2/1998 | Hambleton et al. | |
| 6,734,398 B1 * | 5/2004 | Cecchi | B01L 7/00 219/218 |
| 6,871,507 B1 * | 3/2005 | Goldsmith | F24F 1/06 62/171 |
| 7,051,797 B2 | 5/2006 | de Leeuw | |
| 2002/0007932 A1 | 1/2002 | Egara | |
| 2004/0248077 A1 | 12/2004 | Rodriguez et al. | |
| 2006/0042289 A1 | 3/2006 | Campbell et al. | |
| 2010/0216382 A1 | 8/2010 | Williams et al. | |
| 2011/0258837 A1 | 10/2011 | Scannon et al. | |
| 2012/0100789 A1 | 4/2012 | Liebsch | |

OTHER PUBLICATIONS

Thermo Scientific NESLAB HX Series Recirculating Chiller, Thermo Scientific Manual P/N U00744, pp. 1-75 (Mar. 26, 2008).
Thermo Scientific NESLAB System III Heat Exchanger, Thermo Scientific Manual P/N U00678, pp. 1-28 (Dec. 7, 2006).
Thermo Scientific NESLAB ThermoFlex 2500, pp. 1-4 (2007).
Thermo Electron Corporation LESLAB RTE and EX Series Bath Circulators, pp. 1-12 (undated).
Thermo Electron Corporation NESLAB ULT Series Bath Circulators, pp. 10-12 (undated).
Thermo Electron Corporation NESLAB RTE CB Series Cold Baths, pp. 14-15 (undated).
Thermo Electron Corporation NESLAB CB Series Cryotrol, p. 16 (undated).
Thermo Electron Corporation NESLAB Merlin Series Recirculating Chillers, pp. 17-20 (undated).
Thermo Electron Corporation NESLAB CC Series Immersion Coolers, pp. 21-25 (undated).
Thermo Electron Corporation NESLAB ThermoFlex 900 Recirculating Chiller, pp. 1-3 (undated).
Thermo Electron Corporation NESLAB ThermoFlex 1400 Recirculating Chiller, pp. 1-4 (2006).
Reflux Condensers, Jencon Laboratory Catalog, p. 794, created on Oct. 2005, modified Apr. 2006.

* cited by examiner

LABORATORY FUME HOOD SYSTEM HAVING RECESSED HEAT EXCHANGER SYSTEM

CROSS-REFERENCE TO RELATED APPLICATIONS

This application is based on and claims priority to U.S. Provisional Application Ser. No. 61/682,951, filed on Aug. 14, 2012, and is a continuation-in-part of U.S. Ser. No. 12/393,362, filed on Feb. 26, 2009, each of which is incorporated herein by reference in its entirety.

STATEMENT REGARDING FEDERALLY SPONSORED RESEARCH OR DEVELOPMENT

Not applicable.

BACKGROUND OF THE INVENTION

Laboratory environments present many challenges for instrument design and the conducting of experiments and procedures. In particular, chemistry laboratories often contain fume hoods with equipment that require the circulation of cooling fluid therein. Such equipment may include, but is not limited to, rotary evaporators, lasers, reflux condenser columns, distillation columns, etc. These types of equipment are commonly used in universities and research and development entities.

Various techniques are known in the art for providing the necessary cooling to the foregoing equipment. For example, tap water may be directly used for cooling a device. Thus, in the instance of a condenser column, tap water may flow from a gooseneck spigot through a hose to the column's outer jacket and is subsequently disposed of through another hose down a drain in the fume hood that connects to the municipal sewer drain. This arrangement suffers from several drawbacks which include the use of large amounts of water that is simply wasted down the drain. In addition, the fume hood risks potential flooding if the cooling hoses become disconnected and the faucet is left on. The condensers must be closely monitored to ensure that large amounts of water do not accumulate, which can damage the fume hood, the equipment therein, and even the laboratory generally (floors and surrounding equipment).

BRIEF SUMMARY OF THE INVENTION

The present invention is directed to a laboratory fume hood system for cooling at least one laboratory device located in the interior work area of the fume hood defined in part by the surrounding fume hood walls. The fume hood wall has a front surface facing the interior work area and a rear surface facing away from the interior work area. The laboratory fume hood system also includes a heat exchanger system comprising a heat exchanger in thermal communication with a primary fluid loop containing chilled fluid and a secondary fluid loop containing cooling fluid. The cooling fluid is transmitted using a pump and is in thermal communication with the laboratory device(s) such that the cooling fluid absorbs heat from and cools the device(s). The primary fluid loop is located behind the fume hood wall (typically located along the rear surface of the fume hood wall via a mounting panel) and not in the interior work area of the fume hood. This significantly decreases the risk of leaks or flooding within the fume hood interior work area and/or the surrounding laboratory. Further, by locating such components behind the fume hood wall, valuable experimental space in the interior work area is conserved.

In a further aspect, the primary fluid loop comprises a chilled fluid inlet and a chilled fluid outlet in thermal communication with the heat exchanger. The chilled fluid inlet and outlet are preferably located behind the fume hood wall and not in the interior work area. For example, the chilled fluid inlet and outlet may be mounted to the rear surface of the mounting panel that is secured to the fume hood wall.

In yet another aspect, the pump is located behind the fume hood wall and not in the interior work area. Preferably, the pump is mounted to the rear surface of the mounting panel that is secured to the fume hood wall.

In still a further aspect, the secondary fluid loop comprises a cooling fluid inlet and a cooling fluid outlet in thermal communication with the heat exchanger. The cooling fluid inlet and outlet are preferably located behind the fume hood wall and not in the interior work area. The cooling fluid inlet and cooling fluid outlet are preferably mounted to the rear surface the mounting panel secured to the fume hood wall.

In yet another aspect, the heat exchanger is located within the interior work area of the fume hood. For example, the heat exchanger may be mounted to the front surface of the fume hood wall facing the interior work area. The heat exchanger preferably is mounted to the front surface of the mounting panel secured to the fume hood wall.

In another aspect, the secondary fluid loop has a fill reservoir to vary the amount of fluid in the secondary fluid loop. The fill reservoir is preferably located within the interior work area of the fume hood. The fill reservoir is preferably mounted to the front surface of the mounting panel. In another aspect, the fill reservoir is connected to tubing or conduit which traverses the mounting panel (from the front surface to the rear surface) and connects to the pump located behind the fume hood wall.

In another aspect, the fume hood wall comprises an interior wall adjacent to the interior work area of the fume hood, an exterior wall, and a space between the interior wall and the exterior wall. The primary fluid loop is located within the space. The cooling fluid inlet, cooling fluid outlet, chilled fluid inlet, and/or chilled fluid outlet are preferably located within the space between the exterior wall and interior wall of the fume hood wall.

In another aspect, the present invention is directed to a method for cooling at least one laboratory device located in the interior work area of the laboratory fume hood. The cooling method includes the steps of providing a heat exchanger system as generally described herein, transmitting the cooling fluid within the secondary loop and transmitting chilled fluid within the primary loop such that the chilled fluid cools the cooling fluid at the heat exchanger, and such that the cooling fluid cools the device. In a preferred aspect, the cooling method includes providing heat exchanger system comprising a heat exchanger in thermal communication with the primary fluid loop and the secondary fluid loop such that the primary fluid loop is located behind the fume hood wall and not in the interior work area. In another aspect, the cooling method includes the step of positioning the pump behind the fume hood wall, such as by mounting the pump to the rear surface of the fume hood wall or the mounting panel. In yet another aspect, the cooling method includes the step of positioning the chilled fluid inlet to the heat exchanger and the chilled fluid outlet from the heat exchanger behind the fume hood wall and not in the interior work area. In still another aspect, the cooling method includes the step of positioning the cooling fluid inlet to the heat exchanger and the cooling fluid outlet from the heat exchanger behind the fume hood wall and not in the interior work area. In the most preferred aspect, the primary fluid loop is located in the space between the interior wall and the exterior wall of the fume hood wall.

In another aspect, the present invention is directed to a method for manufacturing the fume hood and heat exchanger system in accordance with the present invention. In a preferred aspect, the manufacturing method includes providing a heat exchanger system comprising a heat exchanger in thermal communication with the primary fluid loop and the secondary fluid loop such that the primary fluid loop is located behind the fume hood wall and not in the interior work area. In another aspect, the manufacturing method includes the step of positioning the pump behind the fume hood wall, such as by mounting the pump to the rear surface of the fume hood wall or the mounting panel. In yet another aspect, the manufacturing method includes the step of positioning the chilled fluid inlet to the heat exchanger and a chilled fluid outlet from the heat exchanger behind the fume hood wall and not in the interior work area. In still another aspect, the manufacturing method includes the step of positioning the cooling fluid inlet to the heat exchanger and the cooling fluid outlet from the heat exchanger behind the fume hood wall and not in the interior work area. In the most preferred aspect, the primary fluid loop is located in the space between the interior wall and the exterior wall.

Additional aspects of the invention, together with the advantages and novel features appurtenant thereto, will be set forth in part in the description which follows, and in part will become apparent to those skilled in the art upon examination of the following, or may be learned from the practice of the invention. The objects and advantages of the invention may be realized and attained by means of the instrumentalities and combinations particularly pointed out in the appended claims.

DETAILED DESCRIPTION OF PREFERRED EMBODIMENT

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials, and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. It should be appreciated that as used herein the term "fluid" is intended to mean any fluid capable and suitable for use as a heat exchanging medium, e.g., water, propylene glycol, ethylene glycol, etc., and that the description of such fluids does not limit the scope of the claimed invention to any particular fluid discussed. Although any methods, devices, or materials similar or equivalent to those described herein can be used in the practice or testing of the invention, the preferred methods, devices, and materials are now described.

The present invention is directed to a laboratory fume hood system. U.S. patent application Ser. No. 12/393,362 filed on Feb. 26, 2009 titled "Apparatus for Providing for Coolant Fluid" is incorporated by reference in its entirety.

Figure 1:
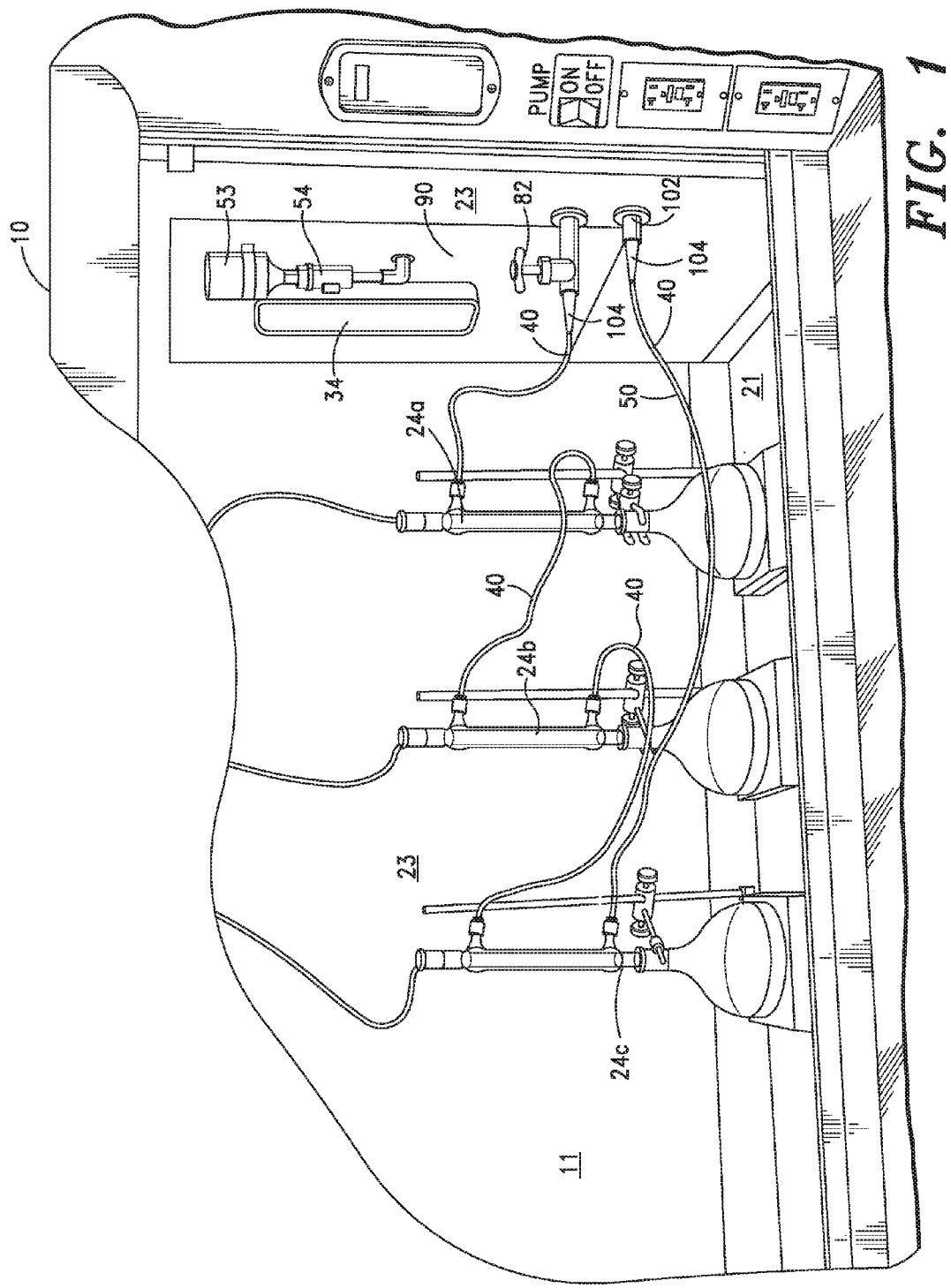
FIG. 1 is a perspective view of an exemplary laboratory fume hood system in accordance with the present invention. In this exemplary embodiment, a heat exchanger system is used to cool three condensers.

FIG. 1 shows a perspective view of a laboratory fume hood system 10. The laboratory fume hood system 10 has an interior work area 11 where experiments are conducted. Air in the laboratory fume hood system 10 is exhausted through a vent (not shown) to the environment outside the laboratory, e.g., at the building roof level and may include air scrubbing capabilities when required by the types of materials used in the fume hood. The interior work area 11 includes a horizontal work surface 21 and is typically defined by vertical fume hood walls 23 with an open vertical front region. One or more laboratory devices 24 are located within the interior work area 11. For illustration purposes, the fume hood shown in FIG. 1 is equipped with a plurality of laboratory devices, namely three reflux condensers columns 24a, 24b, and 24c.

The operation of the exemplary laboratory device 24, which is a Liebig condenser commercially available from Sigma-Aldrich, will now be described in more detail. In general, a solution within a flask is heated by heating mantle. As the solution is heated, some portion of the solution volatilizes. In order to maintain the concentration ratios of components within solution, any vapor that is driven off must be returned to the solution. Thus, reflux condenser column is included above a flask and has a cooling fluid flowing thereabout, so that as the vapor rises within column, the vapor condenses due to the relative cooled temperature of column and subsequently returns in liquid form to solution in the flask. The tubing at the top of the condenser is typically connected to a source of inert gas to help keep the contents of the flask under an inert atmosphere. It will be appreciated that the foregoing description is but one example of how the cooling fluid provided by the heat exchanger system of the present invention may be used. One of ordinary skill in the art will appreciate that a number of other uses of such cooling fluid also exist, e.g., rotary evaporators, lasers, distillation columns, condenser columns, etc., and such uses are within the spirit and scope of the claimed invention.

Figure 2:
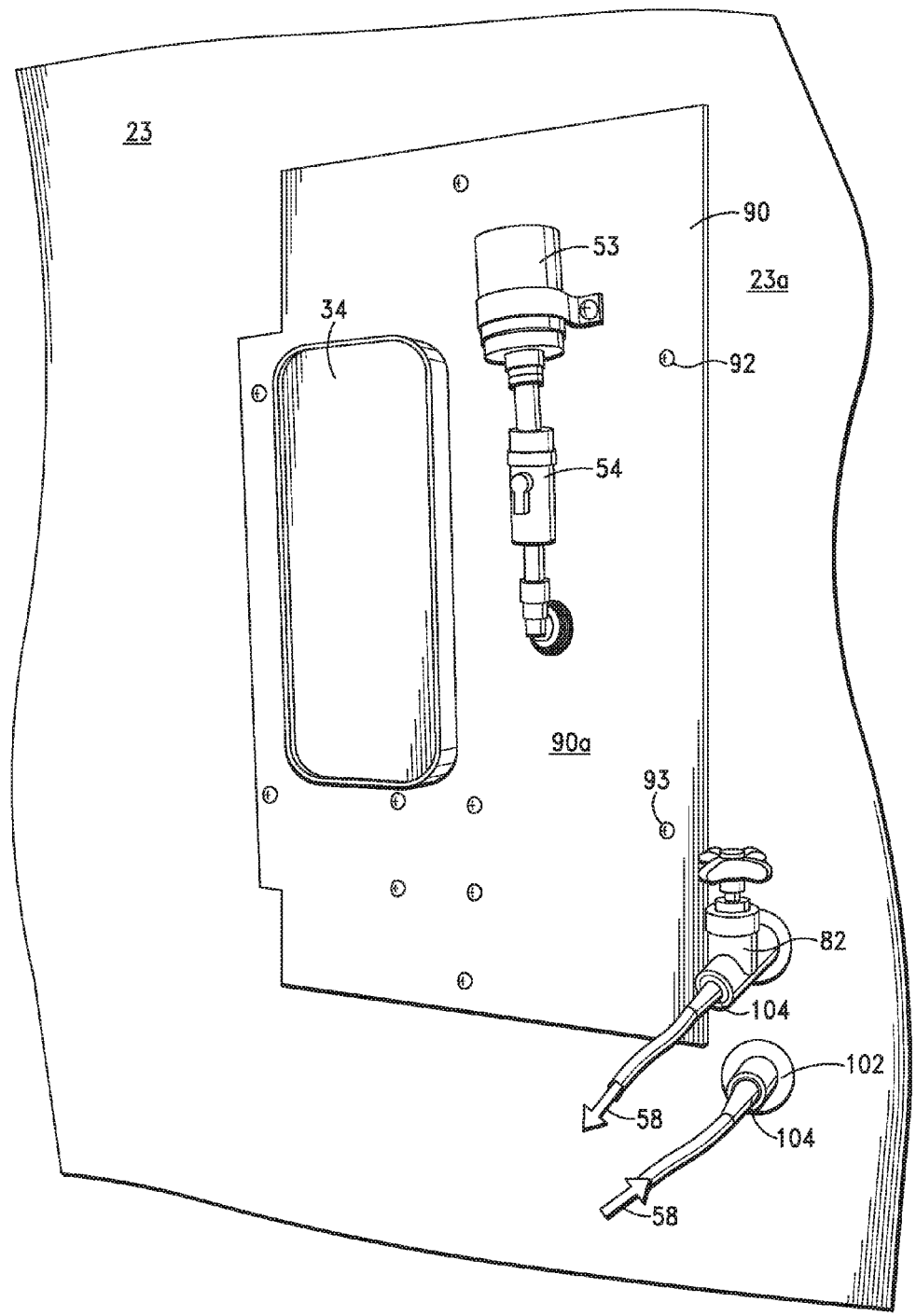
FIG. 2 is a perspective view of the front surface of a wall of the laboratory fume hood system showing the heat exchanger, the fill reservoir, and part of the secondary fluid loop used to cool the condensers.
Figure 3:
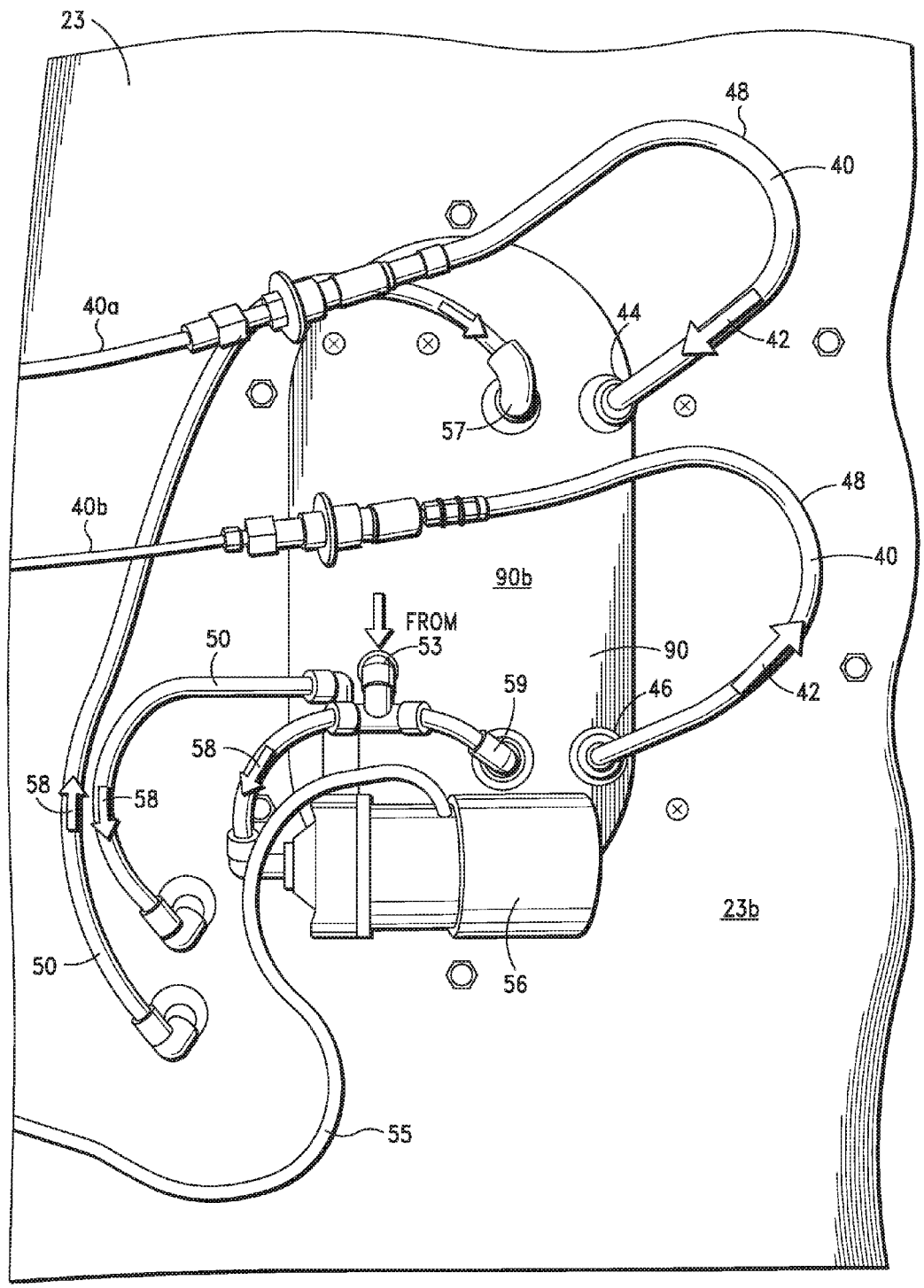
FIG. 3 is a perspective view showing the back surface of the fume hood wall shown in FIG. 2. The primary fluid loop is located behind the wall and not in the interior work area of the fume hood.
Figure 5:
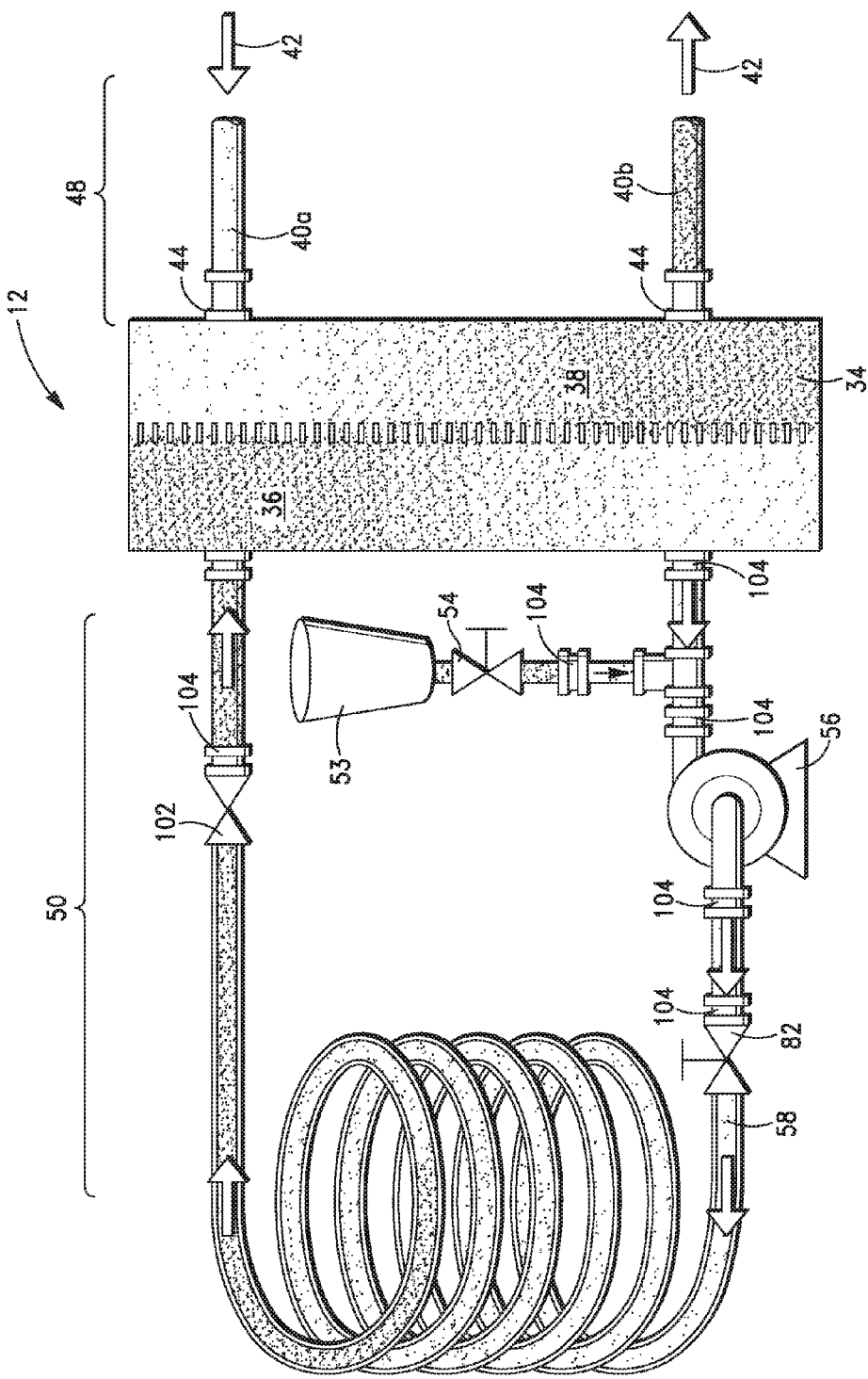
FIG. 5 is a schematic showing operation of the heat exchanger system in accordance with the present invention.

In the present invention, the laboratory fume hood system 10 has a heat exchanger system 12 for cooling the laboratory device(s). The operation of the system is schematically shown in FIG. 5, although the components are best illustrated in FIGS. 2 and 3. In general, the heat exchanger system 12 includes a heat exchanger 34, a primary fluid loop 48 containing chilled fluid 42, and a secondary fluid loop 50 containing cooling fluid 58. The heat exchanger permits thermal communication between the two fluids such that the chilled fluid 42 absorbs heat from and thus cools the cooling fluid 58. Typically, the chilled fluid 42 enters the heat exchanger at very cold temperatures, i.e., a temperature above its freezing point but substantially less than room temperature. For example, when water is used as the chilled fluid, the temperature of the chilled fluid prior to entry into the heat exchanger is about 2 to 20° C. (e.g., about 2, 5, 10, 15, or 20° C. or some range therebetween). As the chilled fluid (water) traverses the heat exchanger, it absorbs heat from the cooling fluid 58 such that the chilled fluid (water) 42 exits the heat exchanger at a much warmer temperature. Although the exit temperature could theoretically be near boiling, in practice, the heat capacity of the fluids, the flow of fluids through the primary and secondary loop, and the efficiency of the heat exchanger is sufficiently high so as to prevent the temperature of either fluid from approaching boiling temperatures during normal operation of the heat exchanger system. With the exemplary device shown, the heat exchanger lowers the temperature of the cooling fluid in the circulating secondary fluid loop such that it properly condenses the refluxing fluid. The exit temperature is typically about 15 to about 50° C. (e.g., about 15, 20, 25, 30, 35, 40, 45, 50° C. or some range therebetween). Typically, change in temperature of the chilled fluid as a result of traversing the heat exchanger is about 5 to 20° C. (e.g., about 5, 10, 15, or 20° C. or some range therebetween). The chilled fluid (e.g., water) is then circulated for re-cooling via a refrigeration unit or disposed of into a municipal drain, thereby completing the primary "loop." Meanwhile, the cooling fluid 58 enters the heat exchanger at a temperature approaching the operational temperature of the device(s) 24 and exits the heat exchanger at a substantially lower temperature by virtue of being in thermal communication with the primary fluid loop. The cooling fluid 58 typically enters the heat exchanger at a temperature ranging between about 25° and well below the boiling point, e.g., about 40, 45, 50, 55, or 60° C. or some range therebetween. Typically, change in temperature of the cooling fluid as a result of traversing the heat exchanger is about 5 to 50° C. (e.g., about 5, 10, 15, 20, 25, 30, 35, 40, or 50° C. or some range therebetween). It will be appreciated to those skilled in the art that the aforementioned temperature ranges are exemplary and one skilled in the art would be readily able to cool the device(s) to the desired temperatures by varying the flow rates, cooling fluid type, chilled fluid type, heat exchanger efficiency, and other parameters in order to achieve the desired cooling effect.

For illustrative purposes, a conventional plate heat exchanger 34 is depicted in the drawings. One of ordinary skill in the art should appreciate that the heat exchanger may comprise a plate heat exchanger having a plurality of plates, may comprise a shell and tube heat exchanger as are well known in the art, or may comprise any other type of heat exchanger device having hot and cold sides arranged to exchange heat therebetween. The heat exchanger is typically sized to provide about 50,000 to 150,000 BTU/hr.

The primary fluid loop 48 circulates chilled fluid 42, which is used to cool the cooling fluid 58 circulating within the secondary fluid loop 50 using the heat exchanger 34. The chilled fluid 42 in the primary fluid loop 48 may be supplied by a building-wide or area-wide supply of water or other fluid that is chilled to a particular temperature for a variety of uses. The chilled fluid may also be a localized supply of the same, e.g., a single laboratory supply. Water may be drawn from the chilled fluid supply and disposed of down a drain, or for more environmentally conscious reasons, may be returned to the chilled water supply for re-chilling and later recirculation. The chilled fluid for the primary loop could also be supplied by a refrigeration unit, for example, one that recirculates the chilled fluid (e.g., water, ethylene glycol, etc.). The refrigeration unit could be located in the laboratory or elsewhere in the building. A stainless steel hose (about 90 psi) is preferably used to construct the primary fluid loop. The secondary fluid loop 48 comprises cooling fluid 58 used to absorb heat and thus cool one or more devices in the interior work area of the fume hood.

Details of a portion of the secondary fluid loop 50 are shown in FIG. 1. In general, the cooling fluid (typically water) in the secondary fluid loop 50 travels from the heat exchanger 34 through tubing or other conduit to a first device 24a. The secondary fluid loop 50 is in thermal communication with the first device 24a such that the cooling fluid 58 absorbs heat from the device and thereby cools the device 24a. The cooling fluid 58 in the secondary fluid loop 50 then travels to a second device 24b and finally to a third device 24c whereby the cooling fluid is in thermal communication with the devices and cools them in a like manner. Although the secondary fluid loop is illustrated as having the devices 24a, 24b, and 24c arranged in series, it will be appreciated that the devices may also be arranged in parallel, or some other combination thereof. The secondary fluid loop is preferably comprised of rubber tubing and various fittings 104 where appropriate.

As discussed in more detail below, the heat exchanger system 12 is partially recessed in the fume hood wall 23. That is, a portion of the heat exchanger system 12 is located behind one or more of the fume hood walls 23 of the fume hood, and not in the interior work area 11, and thus is not shown in FIG. 1. As discussed more fully below, in a preferred embodiment, users of the fume hood system have no access to the primary fluid loop 48 containing the chilled fluid 42. As a result, there is minimal danger of leaks or flooding within the fume hood interior work area 11 and/or the surrounding laboratory. In an alternative embodiment (not shown), the heat exchanger 34 is located behind the fume hood wall 23, in addition to the primary fluid loop 48 being behind the fume hood wall.

Turning in more detail to the construction of the system, FIG. 2 is a perspective view of the front surface 23a of the wall 23 which faces the interior work area 11. The heat exchanger 34 is directly or indirectly mounted on the front surface 23a of the fume hood wall 23. Typically, the heat exchanger 34 is indirectly mounted to the front surface 23a of the fume hood wall using a mounting panel 90. The mounting panel 90 typically has a plurality of holes 92 arranged thereabout to facilitate releasably securing the mounting panel to the fume hood wall 23. One or more fasteners 93 (e.g., screws, bolts, nuts, and the like) may be inserted into the holes 92 used to attach the mounting panel to the fume hood wall 23. The heat exchanger 34 may be secured to the front surface 90a of the mounting panel 90 via mounting straps, screws, other fasteners, and the like.

FIG. 2 also shows some of the components of the secondary fluid loop 50 in more detail. The secondary fluid loop includes one or more valves for controlling the fluid flow rate through the secondary fluid loop. The valves are typically gate valves, plug valves, glove valves, butterfly valves, diaphragm valves, ball valves, cone valves, or needle valves. In the exemplary embodiment depicted, cooling fluid 58 enters the secondary fluid loop using flow control valve 82, cools the laboratory device(s) 24a, 24b, 24c, and is then returned to the heat exchanger through a hose ribbed valve 102. The valves help retain the cooling fluid 58 within the hot side of the heat exchanger and facilitate removal and/or replacement of the tubing and devices connected to the heat exchanger. Attachment to the heat exchanger may be facilitated by nozzle connections, e.g., barbed fittings 104, whereon tubing may be releasably secured.

The secondary fluid loop 50 also contains a fill reservoir 53, such as a fill cup, to control or vary the amount of amount of cooling fluid in the secondary fluid loop. Cooling fluid is introduced into the fill reservoir, and entry of the cooling fluid into the secondary fluid loop 50 controlled by valve 54. Once the valve 54 is closed, the cooling fluid is no longer exposed to the atmosphere and is typically under pressure. In the exemplary embodiment illustrated, a ball valve is used to introduce cooling fluid into the secondary fluid loop 50. The fill reservoir may be directly or indirectly mounted to the front surface 23a of the wall 23. The fill reservoir 53 is preferably indirectly mounted to the wall 23 by mounting the fill reservoir 53 to the front surface 90a of the mounting panel 90 using a strap, for example as generally shown in FIG. 2.

Some embodiments of the present invention, the secondary fluid loop 50 may also optionally include a means for removing air from the secondary fluid loop, such as an automatic air vent and/or manual air vent (not shown). The secondary fluid loop is exposed to the atmosphere during the filling process; this is how air can be removed from the secondary fluid loop. It should be appreciated that aside from the ability to vent air, if such venting is included, the secondary fluid loop is a sealed system, i.e., the fluid within the fluid circuit is never exposed to the atmosphere and is typically under pressure provided by the pump during operation.

FIG. 3 illustrates the rear surface 23b of the fume hood wall 23 which faces away from the interior work area 11. Various components of the secondary fluid loop 50 may be located behind the wall 23 in the region behind the wall. As shown in FIG. 3 (and FIG. 4), a hole or opening 94 is cut into the fume hood wall 23. Many conventional fume hoods already contain such a hole or opening 94 as part of an access panel to gain access to the electrical, inert gas, vacuum, and/or plumbing for municipal tap water components of the fume hood. In such a case, the access panel may be removed to create the hole or opening 94. The mounting panel 90 is secured to the wall 23 such that the opening 94 is partially (preferably completely) closed.

As shown in FIG. 3, the pump 56 used to transmit the cooling fluid 58 through the secondary fluid loop 50 is located behind the fume hood wall 23. The pump may be either a constant speed pump or a variable speed pump. The pump may also be self-priming, or not, for example. The pump may be directly or indirectly mounted to the rear surface 23b of the wall 23. Preferably, the pump is indirectly mounted to the wall 23 by mounting the pump 56 to the rear surface 90b of the mounting panel 90. The pump is preferably located behind the fume hood wall 23 so that users are not tempted to manipulate the fittings, tubing, or other conduit that render the pump integral with the secondary fluid loop. The pump is typically connected to a power source via a power cord 55 and is preferably turned on by a switch located within or just outside of the fume hood work area.

FIG. 3 also shows that the cooling fluid inlet 57 to the heat exchanger and cooling fluid outlet 59 from the heat exchanger for the cooling fluid 58 are located behind the fume hood wall 23 and not in the interior work area. The cooling fluid inlet 57 and cooling fluid outlet 59 are preferably mounted to the rear surface 90b of the mounting panel 90. The mounting panel 90 has holes to accommodate connection of the cooling fluid inlet and the cooling fluid outlet to the heat exchanger.

In the present invention, the primary fluid loop 48 is located behind the fume hood wall 23. As shown in FIG. 3, the primary fluid loop 48 comprises a chilled fluid 42 for cooling the cooling fluid 58 of the secondary fluid loop 50. The heat exchanger is adapted to receive the chilled fluid 42 from the chilled fluid supply 40a at the chilled fluid inlet 44 and exit the heat exchanger 34 at the chilled fluid outlet 46 to the chilled fluid return 40b. As shown in FIG. 3, the chilled fluid inlet 44 and chilled fluid outlet 46 are not located within the interior work area 11 of the fume hood. Instead, the chilled fluid inlet 44 and outlet 46 of the primary fluid loop 48 are located behind the wall 23 of the fume hood. As a result, the major components of the primary fluid loop 48 are not readily accessible by the user.

The chilled fluid inlet 44 and chilled fluid outlet 46 are preferably directly or indirectly mounted to the rear surface 23b of the wall 23. The chilled fluid inlet 44 and chilled fluid outlet 46 are preferably indirectly attached to the rear surface 23b of the wall 23 using a rear mounting panel 90. The mounting panel 90 has holes to accommodate connection of the chilled fluid inlet and the chilled fluid outlet to the heat exchanger. As shown in the exemplary embodiment, the pump 56, chilled fluid inlet 44, chilled fluid outlet 46, cooling fluid inlet 57 and/or cooling fluid outlet 59 may be secured to the mounting panel 90 such that the chilled fluid and the cooling fluid are in thermal communication with the heat exchanger located on the other side of the mounting panel and wall 23. Further, the mounting panel 90 may contain an opening such that fluid from the fill reservoir 53 may be transmitted through tubing or other conduit to the pump 56.

It will be appreciated that by locating the pump, cooling fluid inlet, cooling fluid outlet, and/or the components of the primary fluid loop behind the wall 23, users will not be tempted to tamper with such items. This significantly decreases the risk of leaks or flooding within the fume hood interior work area 11 and/or the surrounding laboratory. Further, by locating such item behind the fume hood wall, valuable experimental space in the interior work area 11 is conserved.

Figure 4:
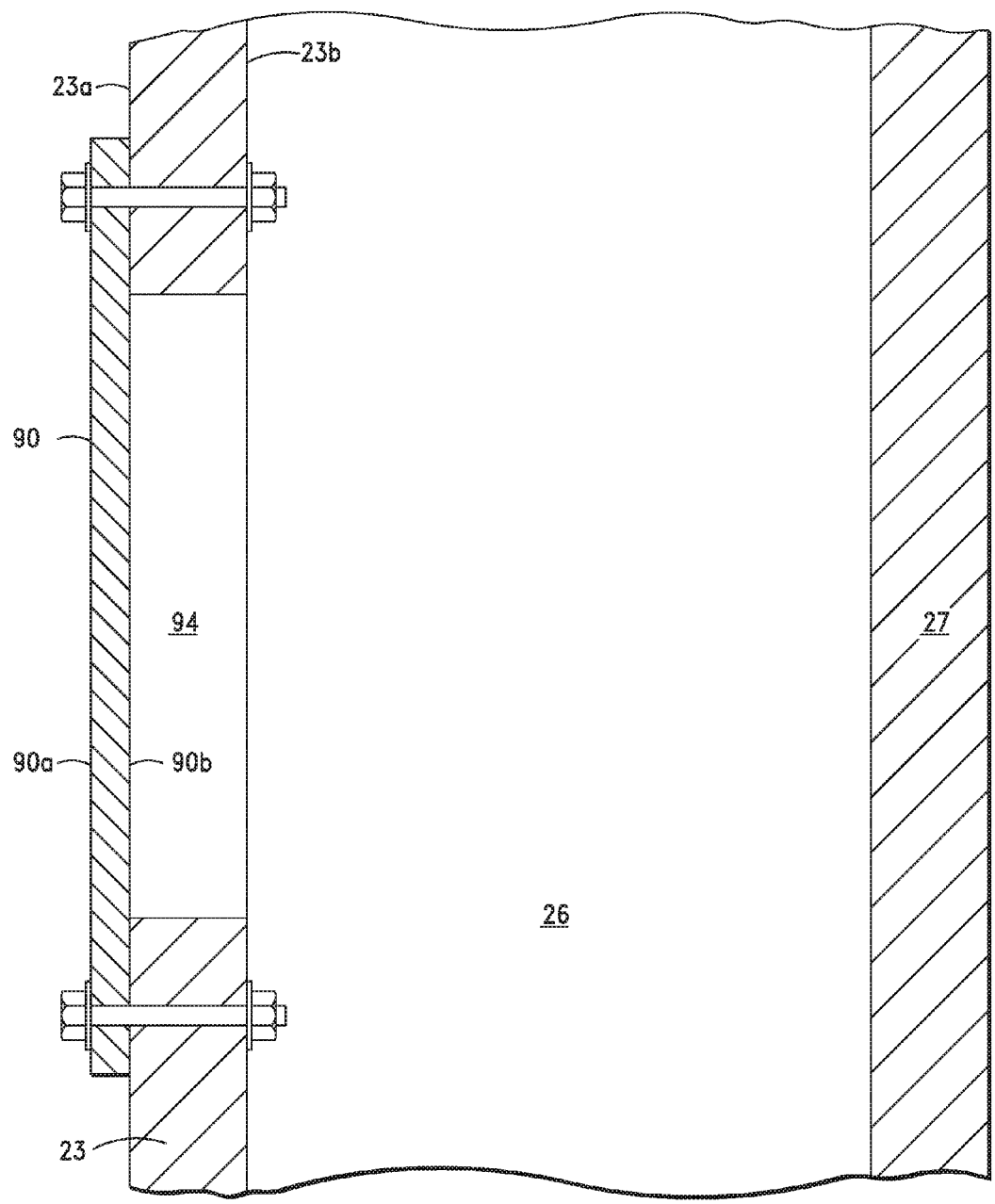
FIG. 4 is a cross-section of a fume hood wall having an interior wall and an exterior wall with a space therebetween. Components of the heat exchanger system are located within this space.

In a preferred aspect, as shown in FIG. 4, the fume hood wall comprises an interior wall 23 which is adjacent to the interior area work area 11 of the fume hood and an exterior wall 27 such that there is a space 26 between the interior wall 23 and the exterior wall 27. The opening 94 is in the interior wall 23. In such an embodiment, the primary fluid loop 48, chilled fluid inlet, chilled fluid outlet, cooling fluid inlet, cooling fluid outlet, and/or pump is located within the space 26 and/or opening 94. The heat exchanger system components described herein are typically directly or indirectly mounted to the rear surface of the fume hood wall, preferably by mounting the components to the rear surface of the mounting panel as discussed herein. The exterior wall 27 may optionally contain one or more access openings (not shown) for accessing the components of the heat exchanger system located in the space 26. Alternatively, the exterior wall 27 may be releasably secured to the laboratory fume hood using one or more fasteners.

FIG. 5 is a schematic illustrating the overall operation of the heat exchanger system. As is known in the art, the heat exchanger 34 has a hot side 36 and a cold side 38. The cold side of the heat exchanger is in thermal communication with the chilled fluid 42 in the primary fluid loop 48 located behind the fume hood wall 23. The hot side of the heat exchanger is in thermal communication with the cooling fluid 58 in the secondary fluid loop 50. The secondary fluid loop 50 is used to cool the devices (not shown in this schematic) located in the interior work area of the fume hood. Cooling fluid 58 is introduced into the secondary fluid loop through a fill reservoir 53, which is controlled by a valve 54. A pump 56 is used to transmit the cooling fluid 58 through the secondary fluid loop 50, whereby the secondary fluid loop is in thermal communication with the device to be cooled. Flow through the secondary loop may be controlled by one or more valves 82, 102.

EXAMPLE

A laboratory fume hood system was constructed. The heat exchanger was a brazed plated heat exchanger (AIC L-Line Series, LB31-10, 90,000 BTU/hour, 6.2 GPM, 5.1 psi). The primary loop comprised a chilled water supply maintained at about 48° F. and about 15 psi and circulated through a stainless steel hose (90 psi). The secondary fluid loop comprised a March AC-3CP-MD variable volume pump (10 GPM, maximum head 50 psi). Various 90 degree hose fittings and union tees (G. A. Murdock, Q0820816, V0820826) were used to connect the polyethylene tubing.

From the foregoing it will be seen that this invention is one well adapted to attain all ends and objectives hereinabove set forth, together with the other advantages which are obvious and which are inherent to the invention. Since many possible embodiments may be made of the invention without departing from the scope thereof, it is to be understood that all matters herein set forth or shown in the accompanying drawings are to be interpreted as illustrative, and not in a limiting sense. While specific embodiments have been shown and discussed, various modifications may of course be made, and the invention is not limited to the specific forms or arrangement of parts and steps described herein, except insofar as such limitations are included in the following claims. For example, the present invention has been illustrated with components of the heat exchanger secured to or otherwise mounted to the mounting panel, which helps provide for easy installation of the heat exchanger system into a fume hood in an almost turnkey fashion. Of course, rather than use a mounting panel, it will be readily appreciated that one or more components of the heat exchanger system (e.g., the heat exchanger, the chilled fluid inlet, the chilled fluid outlet, the cooling fluid outlet, the cooling fluid inlet and/or the fill reservoir) could be secured or otherwise mounted directly to the surfaces 23a, 23b of the fume hood wall. Holes or other openings could be made in the fume hood wall to accommodate traversal of the primary fluid loop, secondary fluid loop and/or fill reservoir as needed. Alternatively, one or more mounting panels could be utilized in the present invention. For example, a front mounting panel could secured to the front surface 23a of the wall and a rear mounting panel could be secured to the rear surface 23b of the wall. The pump, chilled fluid inlet, and/or chilled fluid outlet could be connected or otherwise mounted to the rear mounting panel, while the heat exchanger and/or fill reservoir could be connected or otherwise mounted to the front mounting panel. As another example, the mounting panel 90 could be secured to the front surface 23a of the wall 23 proximate to the interior work area 11 (as shown), or the mounting panel could be secured to the rear surface 23b of the wall 23 (not shown). Further, it will be understood that certain features and subcombinations are of utility and may be employed without reference to other features and subcombinations. This is contemplated by and is within the scope of the claims.

What is claimed and desired to be secured by Letters Patent is as follows:

1. A laboratory fume hood system for cooling at least one laboratory device comprising:
    a laboratory fume hood having an interior work area containing said at least one laboratory device, said fume hood also having a fume hood wall;
    a heat exchanger system comprising a heat exchanger in thermal communication with a primary fluid loop and a secondary fluid loop, wherein the primary fluid loop comprises a chilled fluid, and said secondary fluid loop comprises a cooling fluid;
    wherein said secondary fluid loop has a pump for transmitting the cooling fluid through the secondary fluid loop to said at least one device and wherein said secondary fluid loop is in thermal communication said at least one laboratory device for cooling said at least one device;
    wherein said primary fluid loop is located behind said fume hood wall and not in said interior work area;
    wherein the secondary fluid loop includes one or more valves for controlling a fluid flow rate through the secondary fluid loop; and
    wherein the secondary fluid loop comprises a fill reservoir to vary the amount of amount of fluid in the secondary fluid loop.

2. The laboratory fume hood system of claim 1 wherein said fill reservoir is mounted on a front surface of the fume hood wall facing the interior work area.

3. The laboratory fume hood system of claim 2 wherein said fill reservoir is mounted to said front surface of the fume hood wall by mounting said fill reservoir to a front surface of a mounting panel secured to the fume hood wall.

4. The laboratory fume hood system of claim 1 wherein said fill reservoir is connected to tubing or conduit which traverses said fume hood wall and connects to said pump located behind said fume hood wall.

5. A method for using the laboratory fume hood system of claim 1 to cool the at least one laboratory device comprising:
    providing the heat exchanger system and the laboratory fume hood;
    simultaneously transmitting said cooling fluid within said secondary loop and transmitting chilled fluid within said primary loop such that said chilled fluid cools said cooling fluid at said heat exchanger.

6. The method of claim 5 wherein said providing step comprises mounting said pump to a rear surface of said fume hood wall facing away from the interior work area.

7. The method of claim 5 wherein said providing step comprises mounting said pump to a rear surface of a mounting panel, said mounting panel secured to said fume hood wall.

8. The method of claim 5 wherein said providing step comprises mounting a chilled fluid inlet of said primary loop to said heat exchanger and a chilled fluid outlet of said primary loop from said heat exchanger behind said fume hood wall and not in said interior work area.

9. The method of claim 8 wherein said providing step comprises mounting said chilled fluid inlet and said chilled fluid outlet to a rear surface a mounting panel secured to said fume hood wall.

10. The method of claim 5 wherein said providing step comprises mounting a cooling fluid inlet of said secondary loop to said heat exchanger and a cooling fluid outlet of said secondary loop from said heat exchanger behind said fume hood wall and not in said interior work area.

11. The method of claim 10 wherein said providing step comprises mounting said cooling fluid inlet and said cooling fluid outlet to a rear surface of a mounting panel secured to said fume hood wall.

12. The method of claim 5 wherein said providing step comprises mounting said primary fluid loop within a space of a fume hood wall, said fume hood wall comprising an interior wall adjacent said interior work area of the fume hood an exterior wall such that said space is between the interior wall and the exterior wall.

13. The method of claim 5 wherein said providing step comprises mounting said heat exchanger on a front surface of the fume hood wall facing the interior work area.

14. The method of claim 5 wherein said providing step further comprises the step of mounting a fill reservoir for said secondary loop on a front surface of the fume hood wall facing the interior work area; and varying the amount of fluid in said secondary loop using said fill reservoir.

\* \* \* \* \*

UNITED STATES PATENT AND TRADEMARK OFFICE
CERTIFICATE OF CORRECTION

PATENT NO. : 9,463,495 B2  
APPLICATION NO. : 13/966496  
DATED : October 11, 2016  
INVENTOR(S) : George S. Wilson et al.

Page 1 of 1

It is certified that error appears in the above-identified patent and that said Letters Patent is hereby corrected as shown below:

In the Specification

Column 6,
Line 16, delete "The secondary fluid loop 48" and insert -- "The secondary fluid loop 50" -- therefor.

Signed and Sealed this
Thirtieth Day of May, 2017

Michelle K. Lee
*Director of the United States Patent and Trademark Office*